March 23, 1965  F. HUBER  3,175,137
CAPACITOR WITH METALLIZED ELECTRODES
Filed Jan. 18, 1960
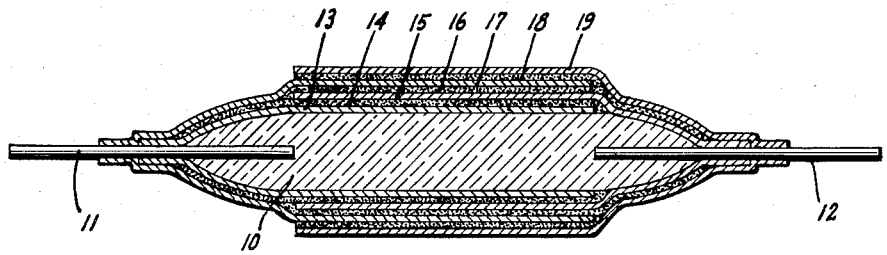
INVENTOR.
FRANZ HUBER
BY
Fordyce A. Bothwell
ATTORNEY

3,175,137
CAPACITOR WITH METALLIZED ELECTRODES
Franz Huber, Philadelphia, Pa., assignor, by mesne assignments, to Philco Corporation, Philadelphia, Pa., a corporation of Delaware
Filed Jan. 18, 1960, Ser. No. 3,202
4 Claims. (Cl. 317—258)

This application is a continuation-in-part of my application Serial No. 859,262 filed December 14, 1959, now abandoned.

This invention relates to capacitors and more particularly to dry or solid-state capacitors. The invention further relates to capacitors of the type which are fabricated by applying a metallic film or layer to an insulating substrate, oxidizing the surface of the film to form an oxide film as the dielectric, and applying a second metallic film to the oxide film.

Modern developments in the electronic arts have given rise to the need for small or miniature capacitors having the characteristics of high capacitance per unit area (or volume), high break-down voltage, low leakage current, and small dissipation factor. For example, the trend toward microminiaturization has given rise to the need for such capacitors.

In the past, efforts have been made to fabricate satisfactory capacitors of the above-mentioned type but such efforts have not been very successful because the fabricated capacitors were not entirely satisfactory and/or because the process employed was too time consuming and expensive.

The principal object of the present invention is to provide improvements in capacitors of the above-mentioned type with a view toward inexpensive fabrication of satisfactory capacitors to meet the aforementioned needs.

In accordance with one feature of the invention, a capacitor is fabricated by evaporating a suitable metal, preferably aluminum, onto an insulating substrate to form a film or layer to constitute one electrode, oxidizing the surface of the metallic film as by anodizing to form a dielectric film, and evaporating metal onto the dielectric film to form a film or layer which constitutes a second or counter electrode. This process, involving evaporation of metal to form both electrodes, is rapid and inexpensive and it produces uniformly good capacitors. One problem in the past has been that application of the second metallic film or layer injured the oxide film. However, I have discovered that this does not occur when metal is applied by evaporation to form both electrodes, the metal forming the respective electrodes preferably being of the same kind, for example aluminum.

I have also discovered that it is possible to fabricate by multi-layering a capacitor having multi-element electrodes whose respective elements are interleaved. This increases the capacitance of the capacitor according to the number of elements. The overall capacitance will be approximately proportional to the number of conductor layers minus 1.

Still another feature of the invention is the fabrication of a capacitor wherein the application of the metallic layers itself serves to effect electrical connection of said layers to terminal elements.

Other objects and features of the invention will become apparent as the description proceeds.

The invention may be fully understood from the following detailed description with reference to the accompanying drawing wherein the single figure is a greatly enlarged longitudinal sectional view of a capacitor fabricated in accordance with this invention.

It will be realized, of course, that the illustration is intended to show the structural make-up of the device and is not intended to be a pictorial reproduction of the device. Actually the films or layers are quite thin and the necessity for showing them thick for clear illustration distorts the proportions.

Referring to the drawing there is shown at 10 an insulating substrate in the form of a cylindrical body of glass or other suitable insulating material. A pair of electrical connectors 11 and 12 have end portions sealed within the body 10 and extend from the opposite ends of said body. For example, if a solid glass body is employed it may be heated to soften the glass and wires (preferably valve metal wires) may be inserted as shown. Alternatively a glass tube may be employed and after insertion of the wires the ends of the tube may be sealed.

A first metallic film or layer 13 is provided on the substrate 10 and has a connector extension onto connector 11. A dielectric film or layer 14 is provided on the metallic film 13. A second metallic film or layer 15 is provided on the dielectric film 14 and has a connector extension over the substrate onto the second connector 12.

It will be seen that the structure as thus far described constitutes a capacitor in which the metallic films 13 and 15 are the plates or electrodes of the capacitor and are connected respectively to the connectors 11 and 12, and of course the invention contemplates such a simple two element capacitor as well as more complex forms such as that shown.

In the capacitor shown, a second dielectric film or layer 16 is provided on the second metallic film 15. A third metallic film or layer 17 is provided on the second dielectric film 16 and has a connector extension so that it is electrically connected to the first metallic film 13 and to the first connector 11. A third dielectric film or layer 18 is provided on the third metallic film 17. A fourth metallic film or layer 19 is provided on the third dielectric film 18 and has a connector extension so that it is electrically connected to the second metallic film 15 and to the second connector 12.

Thus the capacitor illustrated has dual-element electrodes and the elements are interleaved. It will be apparent that the multi-layering fabricating process could be continued to provide, within practical limits, any number of interleaved elements.

In carrying out the fabrication process according to this invention, the substrate should first be thoroughly cleaned. This may be done by means of a suitable cleansing agent but in the case of glass it is preferably done by the glow discharge method, i.e. by exposing the glass surface to a glow discharge. This helps to insure good adhesion of the applied metallic film. The first metallic film is then applied to the cleaned surface. In the case of aluminum, preferably spectroscopically pure aluminum is evaporated onto said surface in any suitable manner, for example by heating a piece of aluminum wire within a tungsten heating coil at a pressure of about $10^{-5}$ mm. Hg. Preferably the substrate is shielded for about a minute to allow for evaporation of any impurities in the aluminum. Then the substrate is exposed to the evaporating aluminum until a suitable film is formed. The evaporation takes place at about 1000° C., and it has been found that an exposure time of not more than 5 minutes (generally 1 minute) is satisfactory. The portion of the substrate which is not to be coated by the first layer may be masked during the application of that layer; for example in the case of the capacitor shown the right hand portion of the substrate 10 would be masked. Also in the case of the capacitor shown the substrate should be rotated about its longitudinal axis during the evaporation so as to provide a uniform thickness of the evaporated aluminum on the cylindrical surface of the substrate.

Following the application of the first metallic film or layer, the unit is allowed to cool and the surface of the applied film is oxidized anodically (i.e. electrolytically with the applied film being the anode) for 10 to 20 minutes at room temperature, for example, to form an oxide film. A small enough leakage current is usually obtained after 15 minutes. In the case of aluminum it has been found that best film forming is achieved by using a non-aqueous electrolyte (e.g. propanediol and oxalic acid or ethylene glycol and oxalic acid) or an electrolyte consisting only partially of water (e.g. a mixture of water, propanediol and oxalic acid, or a mixture of water, ethylene glycol, and oxalic acid). The anodizing may be performed using an applied voltage of 10 to 45 volts, preferably about 45 volts, depending on the expected working voltage. Of course the thickness of the oxide film is determined by the forming voltage, and the capacitance is inversely proportional to the thickness of the oxide film.

Following the oxidation of the surface of the first applied metallic layer, the surface of the oxide film is cleaned with distilled water and is air dried, and the second metallic film layer is then applied in the same manner as was the first metallic film, preferably using the same kind of metal. In the case of aluminum, for example, the second metallic film may be applied by evaporating aluminum onto the desired surface area, masking the area that is not to receive the evaporated aluminum.

Where it is desired to provide multi-element electrodes with the elements interleaved, as in the form illustrated, the process is continued until the desired number of elements and interposed oxide films have been formed, all of the electrode elements preferably being formed of the same kind of metal.

A capacitor formed in accordance with this invention has the desired characteristics of high capacitance per unit area (or volume), high break-down voltage and low leakage current. For example, in the case of a capacitor having two evaporated aluminum films and an interposed oxide film formed with a forming voltage of 45 volts, the capacitance is about 0.13 microfarad per square centimeter, the break-down voltage is about 90% of said forming voltage, i.e. about 40 volts, and the leakage current is less than 0.0001 microampere. Increasing the number of elements increases the capacitance accordingly; for example adding a third evaporated aluminum film doubles the capacitance to about 0.25 microfarad per square centimeter.

The capacitor has the advantage that it is extremely compact and it enables provision of relatively large electrode areas within a relatively small space or volume. The compactness of this capacitor is, of course, due to the fact that the electrode elements are in the form of coaxial sleeves or tubes with the oxide films between them. A miniature capacitor of this form (forming voltage 20 volts), employing a glass rod 20 mm. in length and 5 mm. in diameter and having two aluminum films, has a capacitance of about 1 microfarad.

The multi-layering feature of the present invention is itself an important feature. In the past individual capacitors have been formed on glass plates such as microscope slides, and a number of these have been stacked and their electrodes interconnected to form a capacitor having interleaved electrode elements. This is a crude and bulky arrangement and its fabrication is time-consuming. On the other hand, the multi-layer structure provided by this invention is simple and compact, and its fabrication is simple and inexpensive, involving as it does simply repetitive processing of the same unit.

In this respect the form of capacitor shown in FIG. 1 is further advantageous in that it enables multi-layering within a very small space or volume.

While the invention has been described with reference to the illustrated embodiment it will be understood that the invention is not limited thereto but contemplates such modifications and further embodiments as may occur to those skilled in the art.

I claim:

1. A capacitor comprising: an insulating cylindrical substrate, a pair of spaced electrical connectors extending axially from within the ends of said substrate, a first metallic sleeve-like film extending over a substantial portion of the surface of said substrate and having an end extension engaging one of said connectors, a dielectric film on said metallic film in surrounding relation thereto, and a second metallic sleeve-like film on said dielectric film in surrounding coaxial relation to said first metallic film and having an end extension engaging the other of said connectors, whereby said metallic films constitute coaxial electrode members separated by said dielectric film and electrically connected respectively to said connectors.

2. A capacitor according to claim 1, wherein said metallic films are evaporated aluminum films and said dielectric film is an aluminum oxide film.

3. A capacitor comprising: an insulating cylindrical substrate, a pair of spaced electrical connectors extending axially from within the ends of said substrate, a plurality of sleeve-like metal layers coaxially disposed with respect to said substrate and said connectors, alternate ones of said layers partially overlapping other alternate ones of said layers, the overlapping portions of said layers being separated by coaxially disposed sleeve-like dielectric layers interposed between successive ones of said metal layers so that the overlapping portions of said metal layers and said dielectric layers are supported upon said substrate, the non-overlapping end portions of alternate ones of said metallic layers being in contact with each other and supported by one of said electrical connectors so that all of them are electrically connected to said connector, and the non-overlapping end portions of other alternate ones of said metallic layers being in contact with each other and supported by the other of said electrical connectors so that all of them are electrically connected to said connector.

4. A capacitor comprising: an insulating substrate having a cylindrical portion and tapered end portions, a pair of spaced wires inserted in said end portions and extending axially therefrom, a first metallic sleeve-like film extending over said cylindrical portion and also extending over one of said end portions into engagement with one of said wires, a dielectric film on said metallic film in surrounding relation thereto, and a second metallic sleeve-like film on said dielectric film in surrounding relation thereto and extending over the other of said end portions into engagement with the other of said wires, whereby said metallic films constitute coaxial cylindrical electrode members with opposed tapered extensions engaging said wires.

References Cited by the Examiner

UNITED STATES PATENTS

| | | | |
|---|---|---|---|
| 1,194,195 | 8/16 | Jackson | 317—258 |
| 1,902,942 | 3/33 | Bailey | 317—242 |
| 2,088,949 | 8/37 | Fekete | 317—261 |
| 2,267,717 | 12/41 | Brennan | 317—230 |
| 2,389,419 | 11/45 | Deyrup | 317—261 |
| 2,398,088 | 4/46 | Ehlers | 317—242 |
| 2,408,910 | 10/46 | Burnham | 317—258 |
| 2,504,178 | 4/50 | Burnham | 317—258 |
| 2,759,854 | 8/56 | Kilby | 317—242 X |
| 2,917,687 | 12/59 | Haas | 317—260 |
| 3,102,216 | 8/63 | McGraw | 317—242 |

JOHN F. BURNS, *Primary Examiner.*

LLOYD McCOLLUM, SAMUEL BERNSTEIN,

*Examiners.*